United States Patent
Stiller

(10) Patent No.: US 7,652,686 B2
(45) Date of Patent: Jan. 26, 2010

(54) DEVICE FOR IMAGE DETECTING OBJECTS, PEOPLE OR SIMILAR IN THE AREA SURROUNDING A VEHICLE

(75) Inventor: Christoph Stiller, Ettlingen (DE)

(73) Assignee: Robert Bosch GmbH, Stuttgart (DE)

( * ) Notice: Subject to any disclaimer, the term of this patent is extended or adjusted under 35 U.S.C. 154(b) by 744 days.

(21) Appl. No.: 10/481,971

(22) PCT Filed: Jun. 15, 2002

(86) PCT No.: PCT/DE02/02190

§ 371 (c)(1),
(2), (4) Date: Jul. 30, 2004

(87) PCT Pub. No.: WO03/002375

PCT Pub. Date: Jan. 9, 2003

(65) Prior Publication Data

US 2005/0030378 A1 Feb. 10, 2005

(30) Foreign Application Priority Data

Jun. 28, 2001 (DE) ................................ 101 31 196

(51) Int. Cl.
*H04N 7/18* (2006.01)
*H04N 5/225* (2006.01)
(52) U.S. Cl. ........................ 348/148; 348/218
(58) Field of Classification Search ................ 348/42, 348/50, 148, 143, 139, 622, 207, 116, 333, 348/118, 222, 36, 48, 49, 239, 218, 219, 348/43, 261, 47, 44, 263, 373; 382/104, 382/154, 106, 107, 275, 284, 299, 260, 194; 340/937, 942, 932; 702/127, 149, 159, 158; 396/110, 128, 324, 327, 386, 377, 384, 385, 396/322

See application file for complete search history.

(56) References Cited

U.S. PATENT DOCUMENTS 4,751,570 A * 6/1988 Robinson ..................... 348/47

(Continued)

FOREIGN PATENT DOCUMENTS

DE 4420422 12/1995

(Continued)

OTHER PUBLICATIONS

Grosso E et al: "Active/dynamic vision" IEEE Transactions on Pattern Analysis and Machine Intelligence, Sep. 1995, USA, vol. 17. No. 9. pp. 868-879.

(Continued)

*Primary Examiner*—Behrooz Senfi
(74) *Attorney, Agent, or Firm*—Kenyon & Kenyon LLP

(57) ABSTRACT

A device for detecting objects, persons or the like, including, for example, in the surroundings of a vehicle, has a stereo-sensitive image recording unit which includes at least two image sensors and an evaluation unit to evaluate the signals, supplied by the image sensors, using which, in a simple manner, a three-dimensional geometry of the surroundings of a vehicle is variably recordable at a desired operating range and at a desired viewing angle, and in which the optical axes of the image sensors are changeably alignable relative to each other and/or relative to vehicle.

10 Claims, 4 Drawing Sheets

U.S. PATENT DOCUMENTS

| | | | |
|---|---|---|---|
| 5,473,364 A | | 12/1995 | Burt |
| 5,680,123 A | * | 10/1997 | Lee .............................. 340/937 |
| 5,798,791 A | * | 8/1998 | Katayama et al. ......... 348/218.1 |
| 6,002,430 A | * | 12/1999 | McCall et al. .......... 348/207.99 |
| 6,611,664 B2 | * | 8/2003 | Kochi et al. ................. 396/324 |
| 6,693,518 B2 | * | 2/2004 | Kumata et al. ............... 340/435 |
| 6,993,159 B1 | * | 1/2006 | Ishii et al. ................... 382/104 |
| 7,106,365 B1 | * | 9/2006 | Sogawa .................... 348/222.1 |

FOREIGN PATENT DOCUMENTS

| | | |
|---|---|---|
| DE | 60009114 T | 8/2004 |
| DE | 60029335 T | 11/2006 |
| WO | 92 19811 | 11/1992 |
| WO | WO 92/22172 | 12/1992 |
| WO | 96 38319 | 12/1996 |
| WO | WO 01/21446 | 3/2001 |
| WO | WO 01/28250 | 4/2001 |

OTHER PUBLICATIONS

M. Pellkofer and E.D. Dickmanns, "EMS-Vision: Gaze Control in Autonomous Vehicles", IEEE Intelligent Vehicles Symposium 2000 (Oct. 3-5 2000), *ITSC*, pp. 296 to 301.

U. Franke, A. Joos, "Real-time Stereo Vision for Urban Traffic Scene Understanding", IEEE Intelligent Vehicles Symposium 2000 (Oct. 3-5, 2000), *ITSC*, pp. 296 to 301.

Olivier Faugeras, "Three-Dimensional Computer Vision, A Geometric Viewpoint", Chapter 6, Sections 1 and 2, pp. 165-188, 1993.

\* cited by examiner

DEVICE FOR IMAGE DETECTING OBJECTS, PEOPLE OR SIMILAR IN THE AREA SURROUNDING A VEHICLE

FIELD OF THE INVENTION

The present invention relates to a device for detecting objects, persons or the like, including, for example, objects, persons or the like, in the surroundings of a vehicle.

BACKGROUND INFORMATION

According to the document of IEEE Intelligent Vehicles Symposium, October 2000, "Real-Time Stereo Vision for Urban Traffic Scene Understanding", U. Franke, one may record the surroundings of a vehicle using an image recording unit, which includes a stereo camera for taking three-dimensional images. By evaluating the scene taken, the position of, for example, additional vehicles, persons or objects in the surroundings of the vehicle may be ascertained. In the light of this information, the longitudinal and/or lateral guidance of the vehicle may be influenced by a controller, so that the driver may be supported in his vehicle guidance, and driving comfort and traffic safety may be improved. For example, in the case of a threatening collision, an automatic evasive maneuver or braking maneuver may avoid the collision or at least reduce the collision energy.

According to MIT Press document, 1995, "Three-Dimensional Computer Vision: A Geometric Viewpoint", O. Faugeras, a stereo camera system may ascertain a three-dimensional geometry of the surroundings projected onto the image pair by triangulation, i.e., by determining the intersection of the light beams falling into the left and right camera, respectively. Thereby it may be established that the position of the camera heads, that is, the alignment of their optical axes, of a stereo camera considerably influences the detecting properties, and many objects make stereo-sensing more difficult on account of their position or texture.

The choice of the optical focal length of a rigid stereo set-up may require a compromise between operating range and viewing angle. In vehicle applications, however, high requirements may be set for both variables. Thus, in the case of travel speeds of ca. 200 km/h, an operating range of more than 100 m may be required, for example, according to the so-called "half tachometer rule". At the same time, a reliable recording of traffic signs may require large viewing angles, such as, for example, 70°. These requirements may not be met using other stereo cameras.

As a remedy, IEEE Intelligent Vehicles Symposium, October 2000, "EMS Vision: Gaze Control in Autonomous Vehicles", M. Pellkofer and E. D. Dickmanns, discusses that one may mount individual mono-cameras having different focal lengths on a rotatable platform to widen the recordable viewing angle. In this connection, the camera platform may be aligned with a distant object or with an object that is present laterally to the travel direction, such as a traffic sign.

SUMMARY OF THE INVENTION

The present invention relates to a device, in which a three-dimensional geometry of a vehicle environment may be recorded both at great operating reach and at a wide viewing angle.

Because the image recording unit may include at least two image sensors, the optical axes of the image sensors being variably aligned relative to one another and/or relative to the vehicle, the geometry of the image recording unit may be adjusted to the currently required operating range and the viewing angle, respectively. A desired operating range may be provided via the choice of a long focal length, despite a momentarily lower viewing angle, since an exemplary device according to the present invention may permit a reenlargement of the viewing angle at any time. Furthermore, a variation of a stereo region of the image recording unit may be achieved by the optical axes of the image sensors being able to be aligned variably relative to one another. Depending on the alignment of the optical axes relative to one another, the overlapping region of the recording regions of the individual image sensors may be enlarged or reduced, respectively. In this respect, exemplary embodiments may also be provided, according to which at least one of the image sensors is aligned in the direction of travel, while another one of the image sensors is aligned transversely to the travel direction. Thus, an intermittently monocular image evaluation of each of the signals supplied by the image sensors may be achieved, if, in an appropriate situation, this seems to be required or sufficient. Because the optical axes are, in addition, alignable variably relative to the vehicle, the overlapping region of the recording regions of the image sensors may also be swivelled relative to the vehicle, and there in that position also be varied in its size. Thus, for example, during a parking procedure, a stereo measuring of a sighted parking space may be made, which may be, for example, at the side of the vehicle. Furthermore, it may be provided that, because of the ability variably to set the optical axes, bodies or the like in the surroundings, that are stereo-sensable only with difficulty because of their shape and/or their texture, may be recorded and evaluated.

DETAILED DESCRIPTION

Figure 1A:
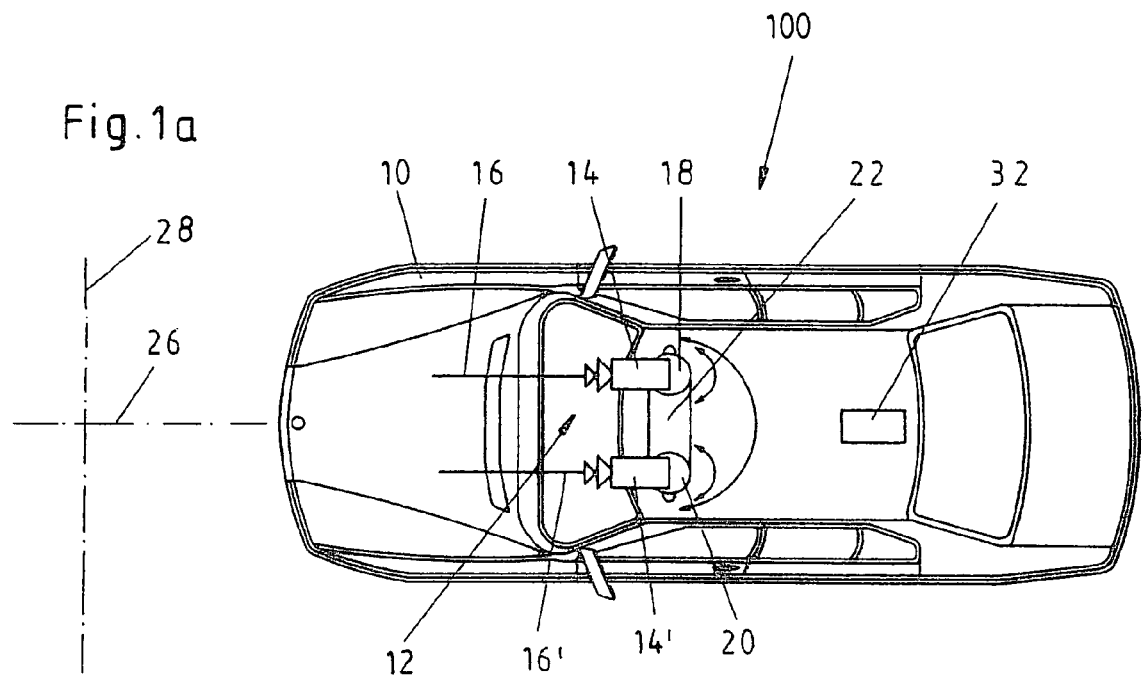
FIG. 1a is a schematic view of a vehicle having an exemplary device according to the present invention.
Figure 1B:
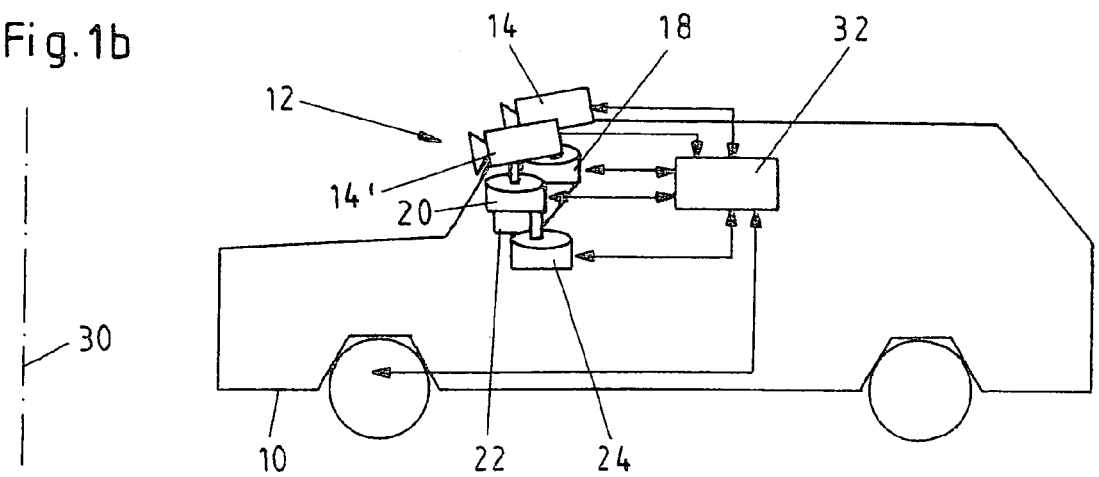
FIG. 1b is a schematic view of a vehicle having an exemplary device according to the present invention.

In FIGS. 1a and 1b, in each case, a vehicle 10 is shown, schematically in a top view and in a side view. Vehicle 10 has a device denoted overall by 100 for the detection of objects, persons or the like in the surroundings of a motor vehicle. Device 100 includes an image recording unit 12 which has two image sensors 14 and 14', respectively (hereafter also called camera 14 or 14', respectively). The cameras 14 and 14' may be constituted, for example, by CMOS cameras. Corresponding to the construction of cameras 14 and 14', they have optical axes 16 and 16', respectively. In FIG. 1a these are shown only schematically. Optical axes 16 and 16' determine the alignment of cameras 14 and 14', respectively, and thus their image recording ranges.

A first drive device 18 is assigned to camera 14 and a second drive device 20 is assigned to camera 14'. Drive devices 18 and 20 are arranged on a carrier 22, to which, in turn, is assigned a third drive device 24. Drive devices 18, 20 and 24, respectively, may be constituted by stepper motors or continuously adjustable motors. Using drive devices 18, 20 and 24, the relative position of optical axes 16 and 16', respectively, of cameras 14 and 14', respectively, to each other and/or to motor vehicle may be changed. In this connection, in principle, a swiveling of optical axes 16 and 16', respectively, with respect to a vehicle longitudinal axis 26, to a vehicle transverse axis 28 and/or to a vehicle vertical axis 30 may take place. According to the exemplary embodiment shown, cameras 14 and 14', respectively, may rotate about the vehicle's vertical axis 30 with the aid of drive devices 18, 20 and 24, respectively. In this connection, camera 14 is rotatable via drive device 18, camera 14' is rotatable via drive device 20 and carrier 22 is rotatable via drive device 24, in each case separately about the vehicle's vertical axis 30, so that, corresponding to the activations of drive devices 18, 20 and 24, any desired alignments of optical axes 16 and 16', respectively, may come about in the horizontal plane. With regard to a possible angle setting of cameras 14 and 14', and thus a corresponding angle setting of optical axes 16 and 16', respectively, to the horizontal plane, these optical axes 16 and 16' may also be changeably alignable relative to each other on a cone envelope surface and/or relative to motor vehicle 10. Image recording unit 12 may be arranged on a roof module of vehicle 10.

Both cameras 14 and 14' and drive devices 18, 20 and 24 are connected to an evaluation unit 32, which includes at least one signal processing processor. With the aid of evaluation unit 32, the image signal(s) supplied by cameras 14 and 14' are processed and control signals for drive devices 18, 20 and 24 are generated. Furthermore, via evaluation unit 32, additional actuators of motor vehicle 10 are controllable, for example, as a function of the images supplied using image recording unit 12. Such actuators may be, for example, actuators of braking devices, e-gas devices (such as, for example, a drive-by-wire system), steering devices or the like. For the purpose of processing signals, the evaluation unit may also be connected to additional sensors that are not shown, by which additional information may be made available, such as operating parameters of motor vehicle.

The function of the exemplary device according to the present invention is explained in greater detail in the light of FIGS. 2 through 7.

Figure 7:
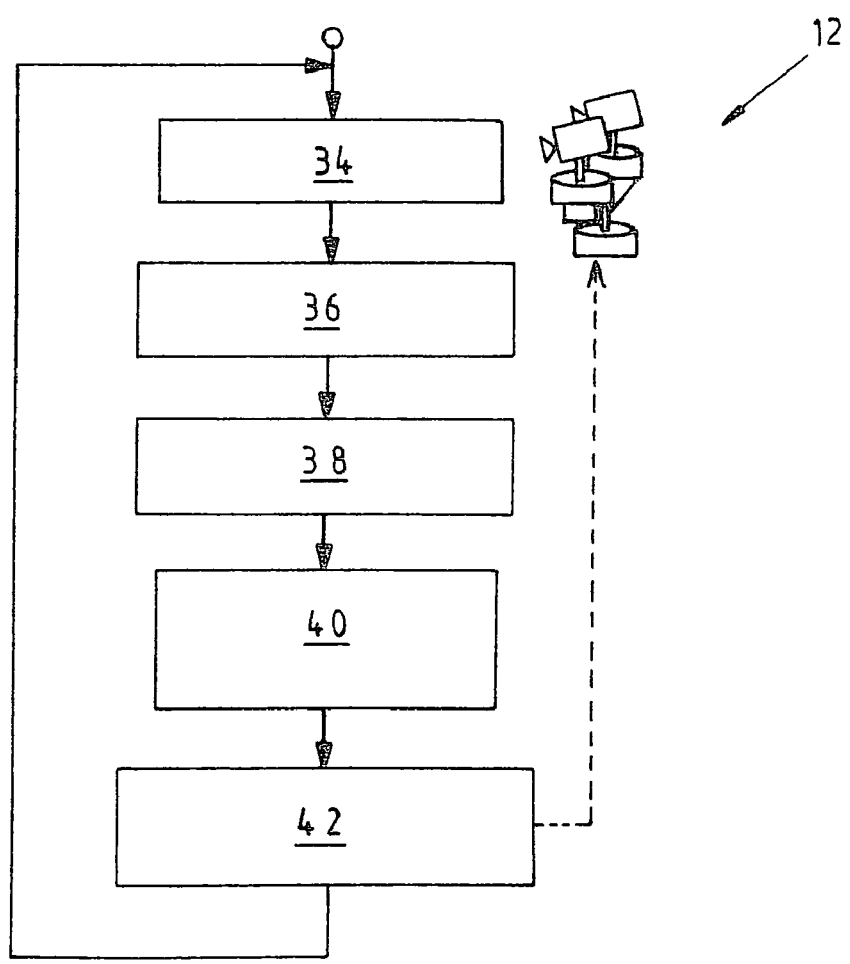
FIG. 7 shows a flow chart of an exemplary method to control of the exemplary device according to the present invention.

FIG. 7 shows a flow chart according to which, in a first step 34, an image pair taken by cameras 14 and 14', respectively, is recorded by evaluation unit 32. In a next step 36, corresponding image regions are searched for in the two images taken from slightly different viewing angles (corresponding to the distance from each other of cameras 14 and 14', respectively). Where these corresponding image regions lie is generated by evaluation unit 32 from the approximate knowledge of the camera settings (known from the controls of drive devices 18, 20 and 24), and optionally from a preceding evaluation of the calibrating and the three-dimensional geometry of the recorded scene. With the aid of this rough knowledge of corresponding image positions, the exact locations of corresponding regions in the two images may be ascertained, using a searching method(s) for the estimation of displacement. From the knowledge now in hand of the corresponding image regions, one may determine the relative orientation of the two cameras 14 and 14', respectively (step 38). This may be done, for example, by ascertaining the so-called essential matrix E by a suitable solution of the equation system, $$\begin{pmatrix} x_1 \\ y_1 \\ 1 \end{pmatrix}^T E \begin{pmatrix} x_2 \\ y_2 \\ 1 \end{pmatrix} = 0$$

the 3×3 matrix satisfying the conditions of an essential matrix, and x and y forming the appropriate coordinates in the image of the right and left camera 14 and 14', respectively. Thus one may obtain a conditional equation for each corresponding pair of points. Therefore, an essential matrix may be determined using a sufficient number of pairs of points. The control, up to now, of drive devices 18, 20 and 24, respectively, as well as the knowledge of the geometry of the scenery from preceding measurements, may be used additionally as prior knowledge for stabilizing the system of equations. Methods, such as a robust, extended Kalman filter, may used as a suitable solving method.

In a next step 40, the recorded scene is submitted to a stereo image evaluation having a known calibration, that is, the geometry of road and of objects, persons or the like is measured in three dimensions. In this context, the previously determined orientation of the two cameras 14 and 14', respectively, and the point correspondences in the triangulation method are combined.

In a next step 42, the recorded scene is analyzed, and from that, suitable regions may be identified, depending on the situation, for a mono-recording and a stereo recording. Corresponding to this identification of mono-regions and stereo regions, drive devices 18, 20 and 24 are controlled appropriately by evaluation unit 32, so that a relative adjustment of optical axes 16 and 16', respectively, to each other, and optionally to motor vehicle 10, comes about. Corresponding to the alignment of optical axes 16 and 16', the image recording regions of cameras 14 and 14', respectively, are more or less overlapped. A developing overlapping region then defines the stereo recording of the recorded scene, and the regions that do not overlap define the mono-recording of the recorded scene.

In the light of FIGS. 2 through 6, a few examples on this matter are indicated schematically, but without making any claim of their being complete for all the possible variants.

In FIGS. 2 to 6, in each case the image recording region of camera 14 is designated as 43, and the image recording region of camera 14' is designated as 44. Depending on the alignment of optical axes 16 and 16', respectively, there may be an overlapping region 46 of the two image recording regions 43 and 44. Overlapping region 46 defines the stereo recording of the recorded scene, and the remaining sections of image version regions 43 and 44 (outside overlapping region 46) define the mono-recording of the recorded scene.

Figure 2:
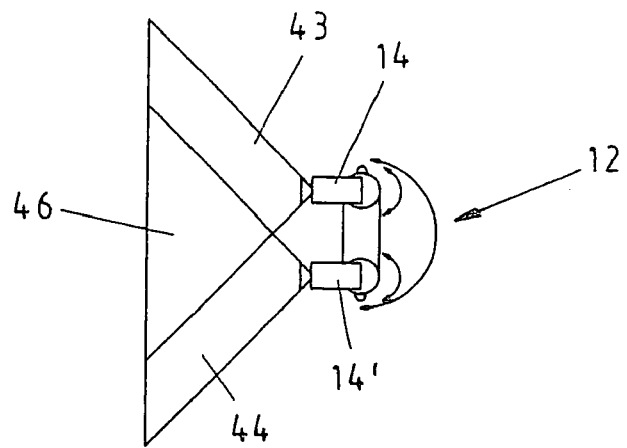
FIG. 2 shows one alignment of the exemplary device according to the present invention.

FIG. 2 shows, for example, that cameras 14 and 14' are aligned parallel to each other in the vehicle's longitudinal axis 26. This may maintain a desired stereo recording region 46 in the travel direction, while edge regions are of subordinate meaning.

Figure 3:
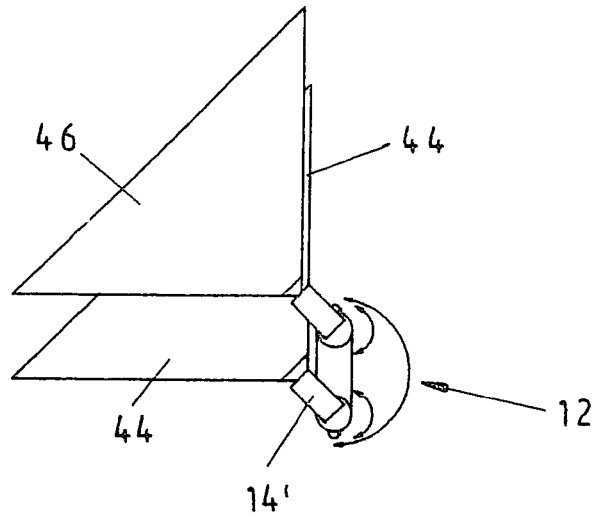
FIG. 3 shows another alignment of the exemplary device according to the present invention.

FIG. 3 illustrates an exemplary embodiment in which cameras 14 and 14' are each aligned swivelled in parallel to the right of the vehicle's longitudinal axis 26. This may yield a large stereo recording region 46 oriented towards the right, which may be suitable, for example, for measuring parking scenarios or the like.

Figure 4:
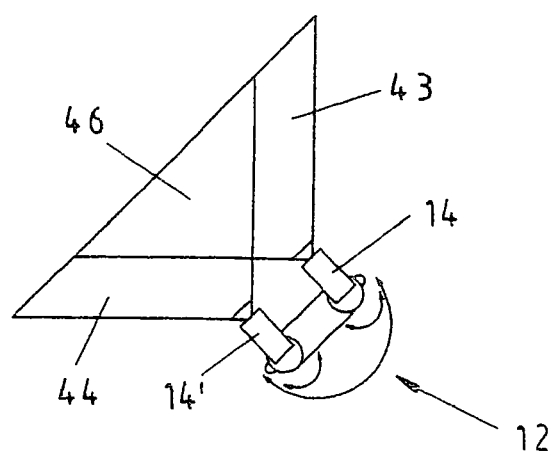
FIG. 4 shows another alignment of the exemplary device according to the present invention.

By contrast to FIG. 3, FIG. 4 shows an exemplary embodiment in which cameras 14 and 14' are not swivelled individually about the vehicle's vertical axis 30 by drive devices 18 and 20, but in which carrier 22 is swivelled altogether about the vehicle's vertical axis 30 by drive device 24. Because of this, there is also maintained a parallel alignment of cameras 14 and 14', and at the same time a greater viewing angle may be implemented as compared to FIG. 3.

Figure 5:
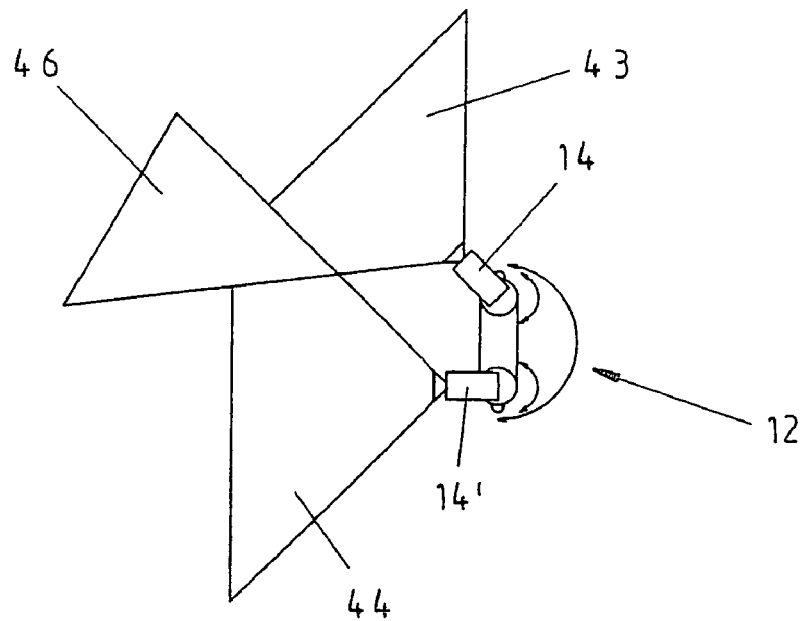
FIG. 5 shows another alignment of the exemplary device according to the present invention.

FIG. 5 shows an exemplary embodiment in which camera 14' remains aligned in vehicle longitudinal axis 26, while camera 14 is swivelled to the right with respect to vehicle longitudinal axis 26. Thereby, for example, having a large viewing angle, traffic signs and the like that are located at the right edge of the roadway may be recorded, and the scene ahead of the motor vehicle in the travel direction may be simultaneously observed.

Figure 6:
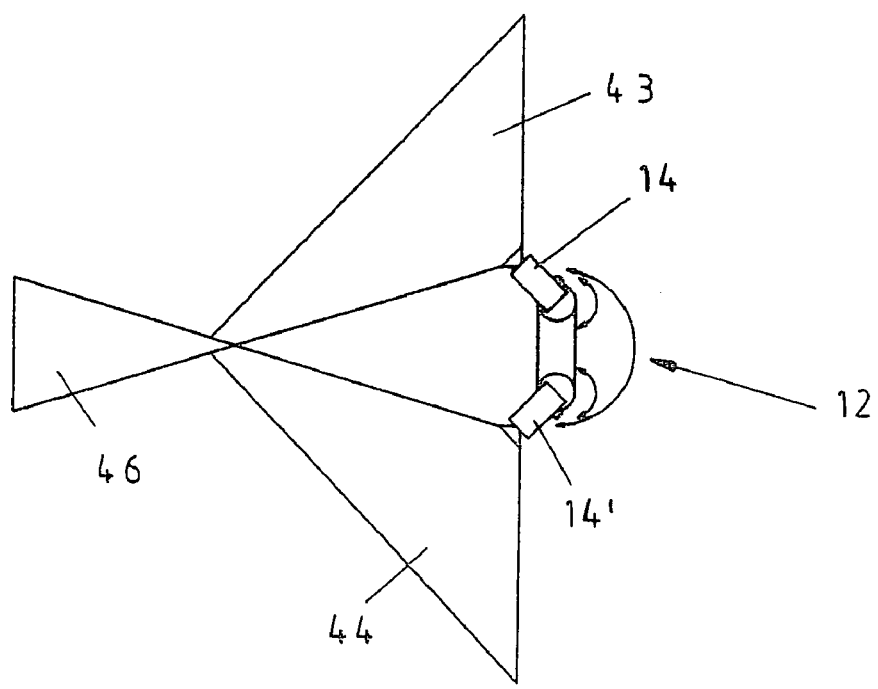
FIG. 6 shows another alignment of the exemplary device according to the present invention.

FIG. 6 shows an exemplary embodiment in which camera 14 is swivelled to the right of vehicle longitudinal axis 26, and camera 14' is swivelled to the left of vehicle longitudinal axis 26. Thereby the viewing angle of image recording unit 12 is enlarged overall, while stereo recording region 46 becomes smaller. With the aid of such an alignment of cameras 14 and 14', respectively, a monocular image processing in particular may take place, that is, having relatively large mono-recording regions 43 and 44. This may be sufficient, for example, for the recognition of traffic signs.

The exemplary embodiments shown demonstrate the potential varied use of image recording unit 12 by drive devices 18, 20 and 24 that are in each case individually controlled. Consequently, one may combine the most widely different viewing angles and operating ranges with the most various stereo recording regions 46 and mono-recording regions 43 and 44, respectively, in a simple manner. In particular, hereby a resolution of lack of security of the stereo analysis may also be provided, which arises when the texture of an object is projected into the image parallel to the epipolar (straight line which describes the locations of possible point correspondences), may also be provided. By rotating the camera base about at least one of the axes 26, 28 and 30, the epipolar in the image may be rotated, so that the texture no longer proceeds in parallel, and the point correspondence may be clearly produced.

The invention claimed is:

1. A device for detecting at least one of an object and a person, comprising:

a stereo-sensitive image recording unit including at least two image sensors;

an evaluation unit to evaluate signals supplied by the at least two image sensors;

a carrier to arrange the at least two image sensors on;

a carrier drive device to drive the carrier, wherein the carrier is rotatable via the carrier drive device; and a drive device assigned to each of the at least two image sensors, wherein the device is operable to detect the at least one of the object and the person in a surrounding vehicle, wherein the optical axes are aligned in a changed manner with respect to at least one of a vehicle longitudinal axis, a vehicle transverse axis, and a vehicle vertical axis;

wherein optical axes of the at least two image sensors are changed relative to each other during operation of the at least two image sensors, so that an overlapping region of recording regions of the at least two image sensors is one of enlarged and reduced, respectively, corresponding to a change of the optical axes, wherein for two images taken from different viewing angles, corresponding to a distance from each other of the at least two image sensors, the evaluation unit searches corresponding image regions in the two images taken from the different viewing angles, wherein the evaluation unit generates where these corresponding image regions lie based on settings of the at least two image sensors, and wherein the evaluation unit, using the corresponding image positions, determines exact locations of the corresponding regions in the two images by using a searching method for estimating a displacement, and wherein based on the corresponding image regions, the evaluation unit determines a relative orientation of the at least two image sensors by determining an essential matrix E by a suitable solution of the equation system, $$\begin{pmatrix} x_1 \\ y_1 \\ 1 \end{pmatrix}^T E \begin{pmatrix} x_2 \\ y_2 \\ 1 \end{pmatrix} = 0$$

the 3×3 matrix satisfying the conditions of an essential matrix, and x and v forming the appropriate coordinates in the image of right and left one of the at least two image sensors, respectively, wherein a conditional equation for each corresponding pair of points is obtained.

2. The device of claim 1, wherein the optical axes are alignable in a horizontal plane.

3. The device of claim 1, wherein the optical axes are alignable on cone envelope surfaces.

4. The device of claim 1, wherein the image recording unit is arranged at a roof region of a vehicle.

5. The device of claim 1, wherein the image sensors include CMOS cameras.

6. The device of claim 1, wherein the drive device assigned to each of the at least two image sensors includes one of a stepper motor and a motor that is continuously adjustable.

7. The device of claim 1, wherein the evaluation unit generates control signals for the drive device as a function of supplied image signals of the at least two image sensors.

8. The device of claim 1, wherein a recorded image is submitted to a stereo image evaluation having a known calibration, including at least one of a geometry of a road, an object, and a person measured in three dimensions, and wherein a previously determined orientation of the at least two image sensors and point correspondences in a triangulation method are combined.

9. The device of claim 8, wherein a recorded image is analyzed and suitable regions are identified for a mono-recording and a stereo recording, and wherein corresponding to the identification of the mono-regions and the stereo regions, the evaluation unit controls the drive devices so as to relatively adjust optical axes as to each other, so that corresponding to the alignment of the optical axes, the image recording regions of the at least two image sensors are essentially overlapped.

10. The device of claim 9, wherein overlapping regions define the stereo recording of the recorded scene, and wherein non-overlapping regions define the mono-recording of the recorded scene.

* * * * *

UNITED STATES PATENT AND TRADEMARK OFFICE
CERTIFICATE OF CORRECTION

| | |
|---|---|
| PATENT NO. | : 7,652,686 B2 |
| APPLICATION NO. | : 10/481971 |
| DATED | : January 26, 2010 |
| INVENTOR(S) | : Christoph Stiller |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 996 days.

Signed and Sealed this

Twenty-third Day of November, 2010

David J. Kappos
*Director of the United States Patent and Trademark Office*